US008804182B2

(12) United States Patent
Kawasaki

(10) Patent No.: US 8,804,182 B2
(45) Date of Patent: Aug. 12, 2014

(54) PRINTING CONTROL APPARATUS, PRINTING CONTROL METHOD, AND COMPUTER-READABLE STORAGE MEDIUM STORING PROGRAM

(75) Inventor: Keiji Kawasaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 715 days.

(21) Appl. No.: 12/779,807

(22) Filed: May 13, 2010

(65) Prior Publication Data
US 2010/0302593 A1 Dec. 2, 2010

(30) Foreign Application Priority Data
Jun. 2, 2009 (JP) .................................. 2009-133171

(51) Int. Cl.
*G06F 15/00* (2006.01)

(52) U.S. Cl.
USPC .......................................... 358/1.16

(58) Field of Classification Search
CPC ............................. G06F 3/1203; G06F 3/1268
USPC ................................................ 358/1.15–1.16
See application file for complete search history.

(56) References Cited

U.S. PATENT DOCUMENTS 7,046,392 B2 * 5/2006 Shibata et al. ................. 358/1.9

FOREIGN PATENT DOCUMENTS

| JP | H8-244308 A | 9/1996 |
| JP | 10044524 A | 2/1998 |
| JP | 10171617 A | 6/1998 |
| JP | 2001018466 A | 1/2001 |
| JP | 2001-051816 A | 2/2001 |
| JP | 2001051816 A | 2/2001 |
| JP | 2002-142089 A | 5/2002 |
| JP | 2004-094395 A | 3/2004 |

\* cited by examiner

*Primary Examiner* — Saeid Ebrahimi Dehkordy
(74) *Attorney, Agent, or Firm* — Canon U.S.A., Inc. IP Division

(57) ABSTRACT

A printing control apparatus confirms whether a predetermined free space is present to stabilize an operation of a system. If it is determined that the predetermined free space is not present, the printing control apparatus deletes at least a part of stored print data. In a case where the predetermined free space becomes available by preliminarily performed deletion processing, the printing control apparatus stores print data of a first copy. Then, in the print processing for second and subsequent copies, if print data of a target page is already present, the printing control apparatus skips the processing for generating the print data of the target page.

22 Claims, 13 Drawing Sheets

PRINTING CONTROL APPARATUS, PRINTING CONTROL METHOD, AND COMPUTER-READABLE STORAGE MEDIUM STORING PROGRAM

BACKGROUND OF THE INVENTION

1. Field of the Invention

The present invention relates to a printing control apparatus that performs multiple copy printing.

2. Description of the Related Art

There is a conventional technique that is employable in a case where multiple copy printing of the same page is designated as a print request. The conventional technique includes generating print data that can be processed by a printer and storing the generated print data in a storage area of a hard disk. The conventional technique further includes referring to the print data having been already generated for the rest of print processing in the multiple copy printing.

According to the above-conventional technique, it is unnecessary to generate print data repetitively when printing of the same page is performed plural times. Therefore, print processing for the second and subsequent copies can be accomplished quickly.

For example, the multiple copy printing can be realized by an uncollating method according to which continuously printing a required number of multiple copies of the same page is prioritized. For example, in a case where printing of two copies of a set of three pages is designated, the uncollating method controls the print processing to perform printing of page 1, page 1, page 2, page 2, page 3, and page 3 in this order.

The multiple copy printing can be also realized by a collating method according to which printing sequential pages of a print job as one complete copy is prioritized. For example, in a case where printing of two copies of a set of three pages is designated, the collating method controls the print processing to perform printing of page 1, page 2, page 3, page 1, page 2, and page 3 in this order.

In a case where the above-described uncollating method is employed for the multiple copy printing, a printer continuously performs printing of the same page. Therefore, according to the above-described procedure for storing print data and later referring to the stored print data, the print data to be stored temporarily is limited to only one page.

On the other hand, in a case where the above-described collating method is employed for the multiple copy printing, print data having been generated for the first copy is reused plural times in the print processing of second and subsequent copies. Therefore, the collating method requires temporarily storing print data of all pages included in each job. Therefore, in a case where a job includes numerous pages, all of the print data may not be wholly stored in a host computer or in a storage area of a printer.

To solve the above-described problem, another conventional technique discussed in Japanese Patent Application Laid-Open No. 8-244308 includes generating print data of the present page in a temporary storage area and then copying the temporarily generated print data to a free space of a storage area only when the free space is available for storage of the generated print data.

However, the above-described conventional technique is not directed to a personal computer (PC) that executes parallel processing of a plurality of applications or processes. In such an environment, it is difficult to exclusively use the storage area for the storage of print data.

Further, according to the above-described conventional technique, print data of one page is first generated in a temporary storage area. However, the storage area of an ordinary PC is shared for various applications. Therefore, if the storage area is in a congested state, even generating print data of only one page may be difficult.

SUMMARY OF THE INVENTION

The present invention is directed to a printing control apparatus that can promptly perform collating printing without bringing any application running on a PC or other system into an unstable operational state. Further, the present invention is directed to a printing control apparatus that can realize minimized processing for the storage of print data and can eliminate any unnecessary file access.

According to an aspect of the present invention, a printing control apparatus includes a storage unit configured to determine whether a free space of a storage device is equal to or less than a predetermined value in a case where print data of a first copy is generated and, if it is determined that the free space of the storage device is equal to or less than the predetermined value, further configured to delete print data stored in the storage device, generate print data of a page to be generated, transfer the generated print data to a printer, and store the generated print data in the storage device; and a transfer unit configured to determine whether print data of the page to be generated is already stored in the storage device in a case where print data of second and subsequent copies is generated and, if it is determined that the print data of the page to be generated is already stored in the storage device, further configured to transfer the print data of the page to be generated, which is stored in the storage device, to the printer and, if it is determined that the print data of the page to be generated is not stored in the storage device, further configured to generate print data of the page to be generated and transfer the generated print data to the printer.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
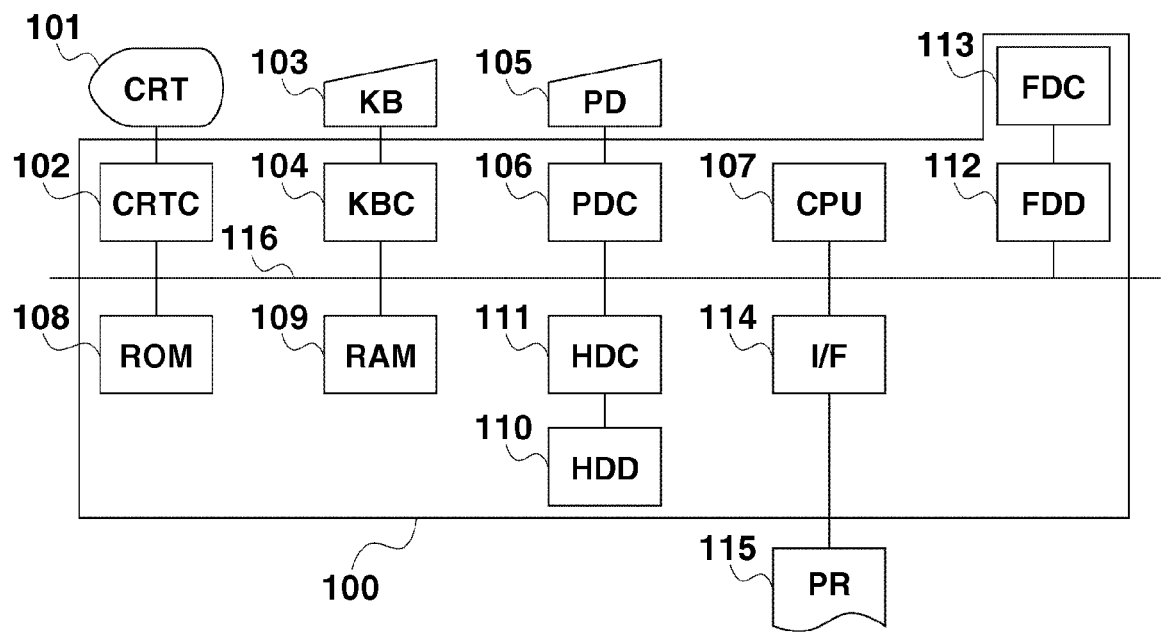
FIG. 1 is a block diagram illustrating a hardware configuration of a printing system according to an exemplary embodiment of the present invention.

FIG. 1 is a block diagram illustrating a hardware configuration of a printing system according to an exemplary embodiment of the present invention. The printing system illustrated in FIG. 1 includes a host computer apparatus 100, a display device (CRT) 101, a keyboard (KB) 103 serving as a data input device, a pointing device (PD) 105 serving as a coordinate input device, and a printer (PR) 115.

The host computer apparatus 100 includes a CRT controller (CRTC) 102 that can control the display device 101 to display print setting dialogs that can be provided by a printer driver and printer status information. The host computer apparatus 100 includes a keyboard controller (KBC) 104 that can control the keyboard 103 and a pointing device controller (PDC) 106 that can control the PD 105.

The host computer apparatus 100 further includes a central processing unit (CPU) 107 that can control various operations to be performed by the printing system. The host computer apparatus 100 includes a plurality of storage devices, such as a read only memory (ROM) 108, a random access memory (RAM) 109, and a hard disk drive (HDD) 110.

The ROM 108 stores a boot program. The RAM 109 can temporarily store an operating system (OS), an application program, and a printer driver program. The RAM 109 can also function as a work area for the CPU 107. The hard disk drive 110 stores the OS, various application programs, printer driver programs, and font data. Further, the hard disk drive 110 can temporarily store spool files.

A hard disk controller (HDC) 111 can control the hard disk drive 110. The host computer apparatus 100 may include a solid state drive or a solid state disk (SSD) as a storage device comparable to the hard disk drive.

A floppy disk drive (FDD) 112 is a driving device that can drive a portable storage medium. A floppy disk controller (FDC) 113 can control the FDD 112. The host computer apparatus 100 further includes an interface (I/F) 114 that is connected to the printer 115 (e.g., an inkjet printer) via an interface cable. The above-described components 102, 104, 106, 107, 108, 109, 111, 112, and 114 can communicate with each other via a bus 116 provided in the host computer apparatus 100.

When a power source of the apparatus is turned on, the CPU 107 starts its operation according to the boot program stored in the ROM 108 and executes the OS loaded from the hard disk drive 110. First, the CPU 107 is brought into a user's instruction waiting state.

Then, if a print instruction or a printer driver's print setting change instruction is input by a user via the PD 105 when an application is operated by the user, the CPU 107 loads a printer driver program from the hard disk drive 110 into the RAM 109 and executes the loaded printer driver program. Further, if an automatic activation function is set for the printer driver program beforehand, the printer driver program is automatically loaded from the hard disk drive 110 into the RAM 109 and executed.

Figure 2:
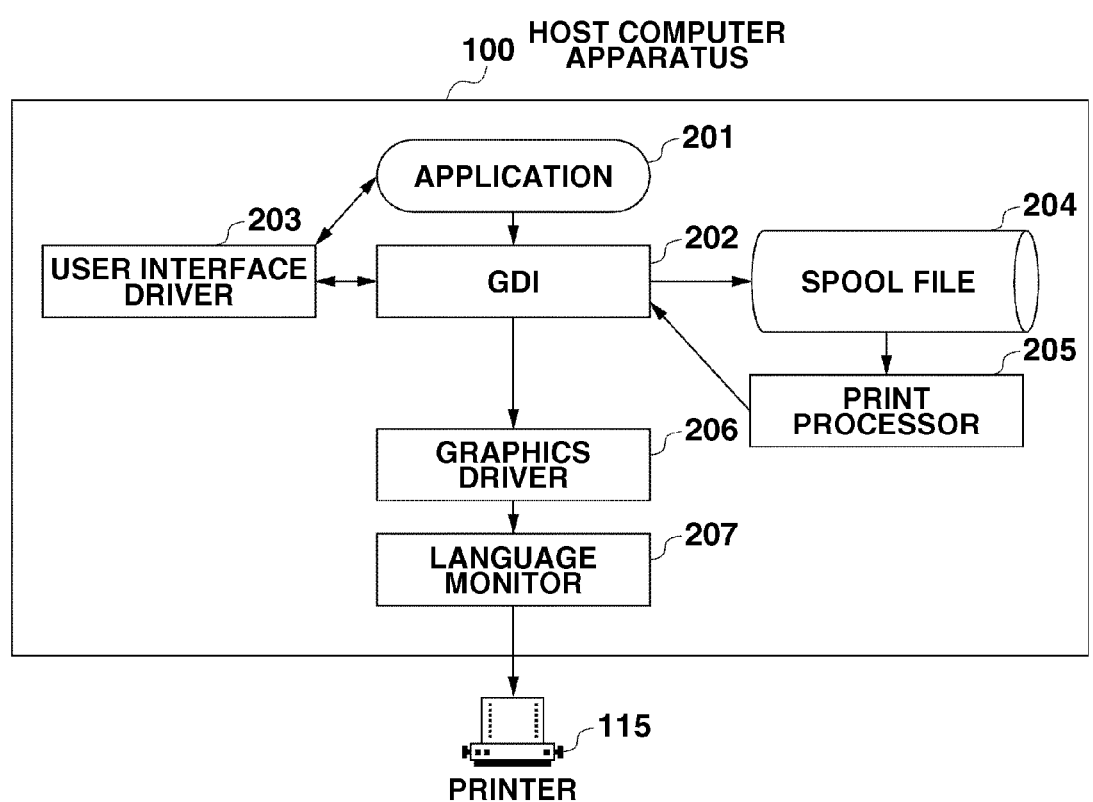
FIG. 2 is a block diagram illustrating a software configuration of the printing system according to an exemplary embodiment of the present invention.

FIG. 2 is a block diagram illustrating an example of a software configuration of (mainly, a printer driver of) the printing system according to an exemplary embodiment of the present invention. The printing system according to the present exemplary embodiment is, for example, realized by a generally used personal computer that installs Windows® operating system (hereinafter, referred to as OS) provided by Microsoft Corporation.

In FIG. 2, an element 100 corresponds to the host computer apparatus 100 illustrated in FIG. 1. Components illustrated in FIG. 2 are all stored in the hard disk drive 110 illustrated in FIG. 1, except for a spool file 204 and the printer 115. A necessary program can be loaded into the RAM 109 when the CPU 107 executes print processing or print setting change processing. Further, in general, when the CPU 107 executes print processing, the spool file 204 is generated in the hard disk drive 110.

First, an application 201 generates a document and, to perform printing of the document, inquires a user interface driver 203 about functions of the printing system. Subsequently, the application 201 notifies the printing system to start a printing operation. The printing system includes a graphics device interface (hereinafter, referred to as "GDI") 202 functioning as a drawing module of the OS.

When the GDI 202 receives a print start notification from the application 201, the GDI 202 notifies the user interface driver 203 of a print start event instructed by the application 201. Subsequently, the application 201 supplies drawing data of a print object document (i.e., document to be printed) to the GDI 202 to continue print processing.

The GDI 202 stores the drawing data as Enhanced Meta File (EMF) data in the spool file 204 and issues a print request to be supplied to a print processor 205. In response to the print request, the print processor 205 reads, from the spool file 204, print output information and drawing data for each page. Then, the print processor 205 outputs the readout information and data of each page to the graphics driver 206 and requests the graphics driver 206 to perform printing.

In the present exemplary embodiment, the print processor 205 is prepared as a module of the OS. However, in a case where a manufacturer of a printer supplies a customized print processor 205 together with the graphics driver 206, the supplied print processor 205 can be installed on the hard disk drive 110.

If the graphics driver 206 receives a print request from the print processor 205, the graphics driver 206 renders the drawing data into raster image data according to a printing resolution of the printer 115, using a GDI rendering engine. The GDI rendering engine is a drawing function provided by the GDI 202.

The raster image data is multi-valued data that can represent color data as a numerical value. The graphics driver 206 performs color processing based on the raster image data to generate halftone data that are separated into color components of respective inks used for the printer 115.

In a case where the raster image data and the halftone data described above are processed at the same time by an amount corresponding to the entire page, a very large memory is required. Therefore, the graphics driver 206 can request the GDI 202 to perform processing for each elongated rectangular area (hereinafter, referred to as "band").

Subsequently, the graphics driver 206 adds a printer command and converts the generated halftone data into print data that can be processed by the printer 115. Then, the graphics driver 206 transmits the converted print data to the printer 115.

More specifically, the data generated by the graphics driver 206 is sent, as a transmission request, to a language monitor 207. The language monitor 207 separates a print job into a plurality of packets each having a specific size and successively sends each packet to the printer 115.

If the printer 115 is a multi-valued printer that can receive multi-valued data, the graphics driver 206 transmits the raster image data, directly or after applying appropriate compression thereon, to the printer 115.

In the printing system illustrated in FIG. 2, if the application 201 generates a print request that designates multiple copies, the printer driver can realize multiple copy printing using any one of the following methods.

The first method includes causing the print processor 205 to repetitively generate a drawing request to be transmitted to the graphics driver 206 a plurality of times corresponding to the designated number of copies. However, according to the first method, the graphics driver 206 executes processing for converting drawing data of the spool file 204 into print data frequently (a plurality of times corresponding to the required number of copies). Therefore, the print processing according to the first method is not so high in efficiency.

The second method includes causing the graphics driver 206 to generate print data in print processing for the first copy and store the generated print data in the hard disk drive 110, and later causing the graphics driver 206 to use stored print data for the second and subsequent copies. The second method can minimize the amount of print data to be generated by the graphics driver 206. Therefore, the second method is efficient compared to the first method. However, the hard disk drive 110 is required to have a free space sufficient to store the print data.

Further, the multiple copy printing that can be realized by the printer driver is generally classified into two types (more specifically, collating printing and uncollating printing), as described above in the description of the background technique.

In a case where the graphics driver 206 reuses the print data having been already generated and temporarily stored in the hard disk drive 110, if a designated print method is collating printing, the amount of the print data stored in the hard disk drive 110 increases to a level equivalent to all pages that are included in a document.

On the other hand, in a case where the graphics driver 206 performs uncollating multiple copy printing, the graphics driver 206 can execute the multiple copy printing as requested if the hard disk drive 110 has a free space comparable to print data of only one page.

In the latter case, even in a case where the print data of one page is not successfully stored, drawing data of the page to be processed is held in the graphics driver 206. Therefore, the graphics driver 206 can continue the print processing by regenerating the same print data based on the drawing data thereof.

In other words, in a case where the collating is not designated in the multiple copy printing, the print processor 205 does not need to send the rendering request of the same page to the graphics driver 206.

On the other hand, when the collating multiple copy printing is performed, printing of the same page is not continued. Therefore, if the graphics driver 206 fails to store the print data, it is necessary to request the print processor 205 to generate the drawing data again. Unless the graphics driver 206 can store the drawing data supplied from the print processor 205 using a special method, the graphics driver 206 cannot refer to spool data of a page different from the currently processed page.

Figure 3:
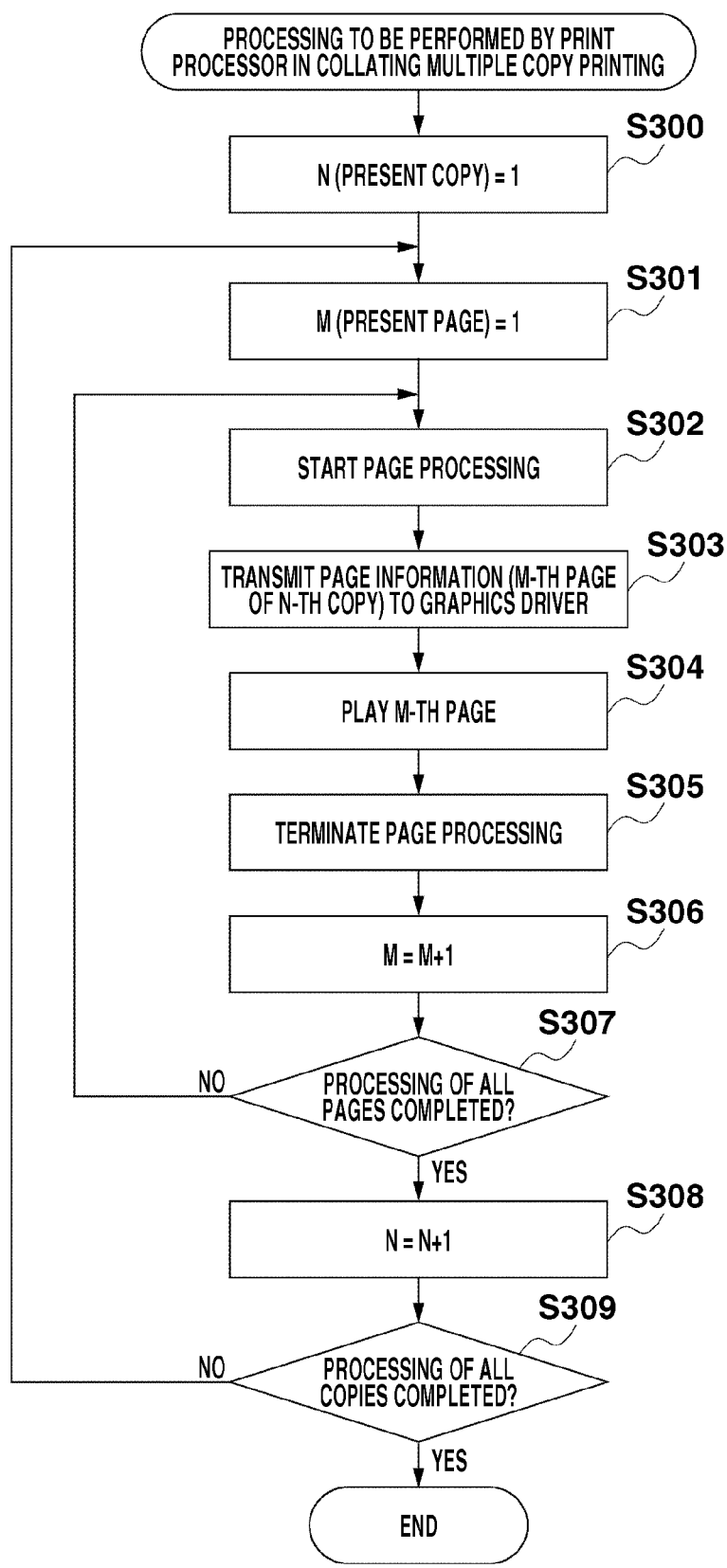
FIG. 3 is a flowchart illustrating an example of collating multiple copy print processing that can be performed by a print processor according to an exemplary embodiment of the present invention.

FIG. 3 is a flowchart illustrating an example of processing to be performed by the print processor 205, after receiving a collating multiple copy printing request and until terminating the print processing, in the printing system according to an exemplary embodiment of the present invention.

The processing of the flowchart illustrated in FIG. 3 relates mainly to the multiple copy printing. However, it is needless to say that the print processor 205 can execute other processing according to another print request. For example, if last-come first-served printing is instructed, the print processor 205 sends drawing data of each page in the reversed order from a spool file to the graphics driver 206.

In step S300, the print processor 205 initializes N to 1, in which N is a parameter indicating a copy number of a currently processed copy. Next, in step S301, the print processor 205 initializes M to 1, in which M is a parameter indicating a page number of a currently processed page.

Subsequently, in step S302, the print processor 205 starts page processing. In the present exemplary embodiment, the print processor 205 calls an application program interface (API) provided by the OS, which is usable to notify page start.

Next, in step S303, the print processor 205 sends page information to the graphics driver 206. The page information to be transmitted to the graphics driver 206 includes the page number M and the copy number N that can identify the page being currently processed.

The print processor 205 can transmit its own information to the graphics driver 206 using an ExtEscape function. The ExtEscape is an example of the API provided by the GDI 202.

Next, in step S304, the print processor 205 reproduces (plays) drawing data of the M-th page for the graphics driver 206. When the drawing data played in this manner reaches the graphics driver 206, the graphics driver 206 can execute print data generation processing.

If the print processor 205 completes the play for drawing data, then in step S305, the print processor 205 terminates the page processing. In this case, similar to the processing having been performed in step S304, the print processor 205 calls the API provided by the OS that can be used to notify page end.

In step S307, the print processor 205 determines whether processing of all pages is completed. If it is determined that at least one page is not processed yet (NO in step S307), the print processor 205 repeats the above-described processing of step S302 through step S306. If it is determined that processing of all pages is completed (YES in step S307), then in step S308, the print processor 205 adds 1 to the copy number N (i.e., N=N+1).

Next, in step S309, the print processor 205 checks whether processing of all copies is completed. If it is determined that at least one copy is not processed yet (NO in step S309), the print processor 205 repeats the above-described processing of step S301 through step S308. If it is determined that processing of all copies is completed (YES in step S309), the print processor 205 terminates the print processing.

As described above, in the printing system according to an exemplary embodiment of the present invention, the print processor 205 plays drawing data of all pages according to an actual printing order when the designated print method is collating multiple copy printing.

Figure 4:
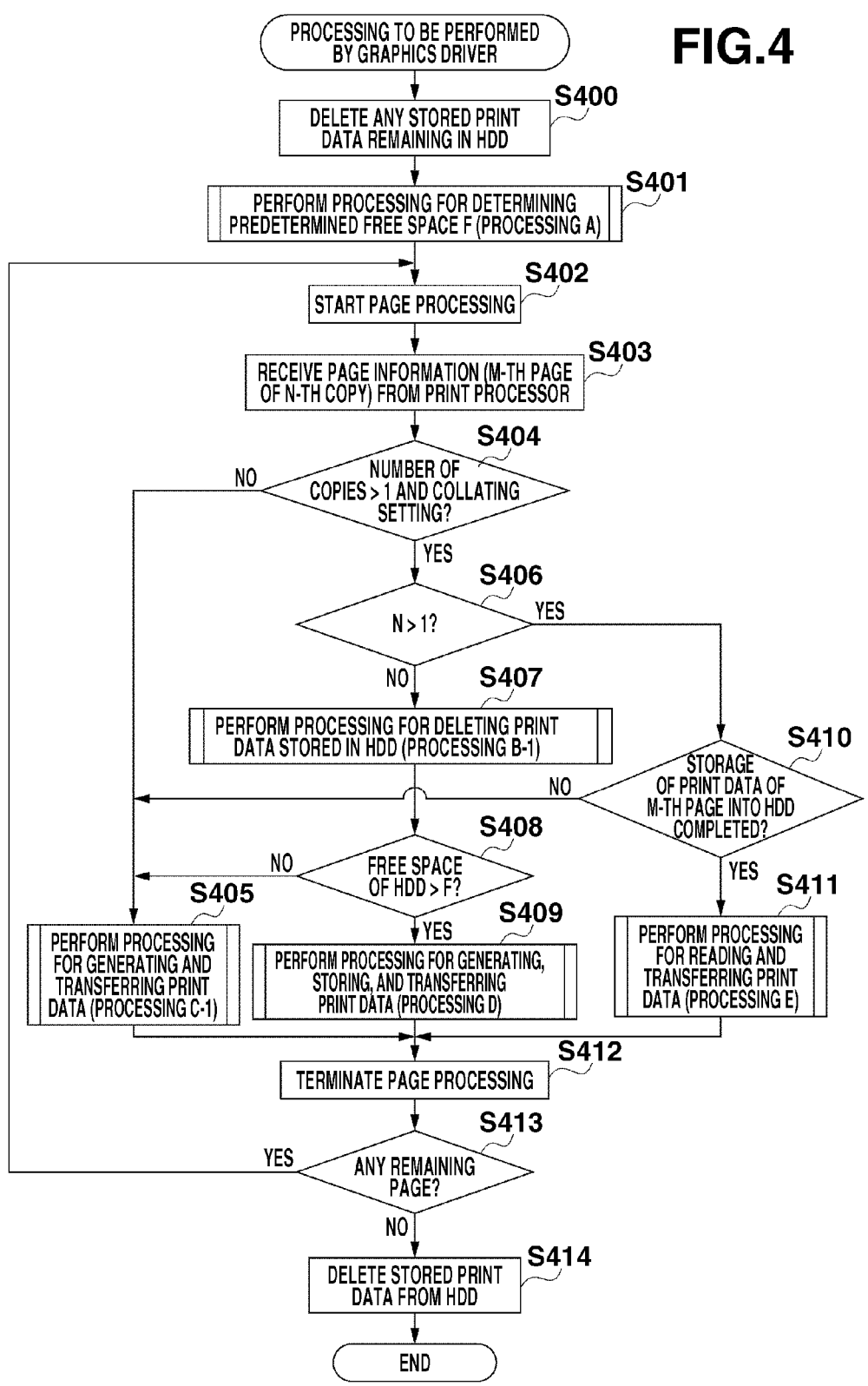
FIG. 4 is a flowchart illustrating an example of print processing that can be performed by a graphics driver according to a first exemplary embodiment of the present invention.

FIG. 4 is a flowchart illustrating an example of processing that can be performed by the graphics driver 206, after receiving a print start request and until terminating the print processing, according to the printing system according to an exemplary embodiment of the present invention.

The processing of the flowchart illustrated in FIG. 4 relates mainly to the collating multiple copy printing. However, it is needless to say that the graphics driver 206 can execute other processing according to another print request.

First, in step S400, the graphics driver 206 checks whether there is any stored print data remaining in the hard disk drive 110. If it is determined that there is at least one stored print data remaining in the hard disk drive 110, the graphics driver 206 executes processing for deleting all of the remaining stored print data.

In general, the graphics driver 206 temporarily stores print data in the hard disk drive 110 and deletes the stored print data when the print processing is terminated. However, if the processing is abnormally terminated, some of the print data may remain undeleted.

In the present exemplary embodiment, the graphics driver 206 searches a file stored in a predetermined storage location and having a file name determined according to predetermined name rules. Then, the graphics driver 206 executes processing for deleting the searched file.

Next, in step S401, the graphics driver 206 executes processing for determining a predetermined free space F (i.e., processing A). More specifically, the graphics driver 206 sets the value F to a predetermined value that does not bring the OS into an unstable state and enables the OS to perform operations normally even if the graphics driver 206 stores print data of one page. An example of the method for determining the value F is described below.

Next, in step S402, the graphics driver 206 starts page processing. More specifically, the graphics driver 206 performs transmission of a print command that instructs starting the page processing to the printer 115. Subsequently, the print processor 205 notifies the graphics driver 206 of the page information transmitted in step S303.

Therefore, in step S403, the graphics driver 206 receives the information and stores the received information in the RAM 109. Subsequently, in step S404, the graphics driver 206 checks whether collating printing of multiple copies is designated in the present print job. Namely, the graphics driver 206 determines whether the number of the requested copies is equal to or greater than 2 and whether collating printing for the copies is designated.

If the graphics driver 206 determines that the processing result in step S404 is NO, then in step S405, the graphics driver 206 generates print data based on drawing data and transfers the generated print data to the printer 115.

In a case where the collating multiple copy printing is not designated, the print data once generated for a specific page is not used again. Therefore, the graphics driver 206 directly transfers the print data to the printer 115 without executing print data storage processing. As described above, when the uncollating multiple copy printing is performed, the graphics driver 206 can store print data and repetitively transfer the print data. The transfer processing to be performed in step S405 (i.e., processing C-1) is described below in more detail with reference to a flowchart illustrated in FIG. 7.

If the graphics driver 206 determines that the processing result in step S404 is YES, then in step S406, the graphics driver 206 checks whether processing of the first copy is currently performed by referring to the value N received from the print processor 205. If it is determined that the processing of the first copy is currently performed, namely, if the graphics driver 206 determines that the processing result in step S406 is NO, then in step S407, the graphics driver 206 performs processing for deleting the print data having been stored in the hard disk drive 110 (i.e., performs the processing B-1).

The purpose of performing the above-described deletion processing is to secure a sufficient free space (i.e., a free space greater than the value F) in the hard disk drive 110, and therefore does not intend to delete all of the stored print data. The deletion processing to be performed in step S407 is described below in more detail with reference to a flowchart of FIG. 6.

After completing the above-described deletion processing, in step S408, the graphics driver 206 checks whether the present free space of the hard disk drive 110 is greater than the value F. The present free space of the hard disk drive 110 can be acquired by using the API provided by the OS.

If it is determined that the present free space of the hard disk drive 110 is equal to or smaller than the value F (NO in step S408), then in step S405, the graphics driver 206 executes processing similar to the processing to be performed in an ordinary printing operation without executing the print data storage processing (i.e., the processing C-1).

If it is determined that the present free space of the hard disk drive 110 is greater than the value F (YES in step S408), then in step S409, the graphics driver 206 executes processing for storing the print data in the hard disk drive 110 in addition to the print data generation and transfer processing.

The storage processing (i.e., processing D) to be performed in step S409 is described below in more detail with reference to a flowchart illustrated in FIG. 8.

If the graphics driver 206 determines that the processing result in step S406 is YES, the processing proceeds to step S410 for processing of the second and subsequent copies. More specifically, in step S410, the graphics driver 206 determines whether storage of print data of the currently processed M-th page into the hard disk drive 110 is completed.

Although described in detail with reference to the flowchart illustrated in FIG. 8 (i.e., details of the processing to be performed in step S409), the graphics driver 206 associates print data with a page number when the print data is stored in the hard disk drive 110, so that the print data can be identified with reference to its page number. Therefore, in the present exemplary embodiment, the graphics driver 206 can check whether the print data having been stored in association with the currently processed page number M is present in the hard disk drive 110.

If the graphics driver 206 determines that the processing result in step S410 is NO, namely in a case where the print data of the M-th page is not present in the hard disk drive 110, the processing proceeds to step S405. In step S405, the graphics driver 206 executes processing similar to the ordinary printing operation (i.e., the processing C-1).

On the other hand, if it is determined that the print data of the M-th page is present in the hard disk drive 110 (YES in step S410), then in step S411, the graphics driver 206 performs processing for reading the print data of the M-th page from the hard disk drive 110 and transferring the readout print data of the M-th page (i.e., processing E).

The processing to be performed in step S411 does not include the print data generation processing. In other words, the graphics driver 206 can promptly accomplish the processing of step S411 because its processing load is low compared to that of the processing C-1 and the processing D. The processing for reading and transferring the print data in step S411 is described below in more detail with reference to a flowchart illustrated in FIG. 9.

As described above, the graphics driver 206 transfers the print data of the currently processed page to the printer 115 using a method corresponding to any one of the above-described processing C-1, processing D, and processing E. If the transfer processing is completed, then in step S412, the graphics driver 206 terminates the page processing. More specifically, the graphics driver 206 performs transmission of a print command that instructs terminating the page processing to the printer 115.

The above-described commands instructing starting and terminating the page processing can be stored together with the print data in step S409. In this case, the graphics driver 206 does not need to transmit the page processing starting and terminating commands in steps S402 and S412.

In step S413, the graphics driver 206 determines whether there is any remaining page whose printing is requested. If it is determined that at least one remaining page is present (YES in step S413), the graphics driver 206 repeats the above-described processing of step S402 through step S412.

If the processing for all pages is completed (NO in step S413), then in step S414, the graphics driver 206 performs processing for finally deleting the stored print data from the hard disk drive 110. In the present exemplary embodiment, the graphics driver 206 deletes the print data of all pages having been generated. In this respect, the processing to be performed in step S414 is different from the processing to be performed in step S407.

As described above, in the present exemplary embodiment, the graphics driver 206 performs the preliminary print data deletion processing (see step S407) and the print data storage processing (see step S409) only when the print processing is performed for the first copy. In other words, the present exemplary embodiment intends to prevent the graphics driver 206 from repeating the print data generation and deletion processing unnecessarily when the print processing is performed for the second and subsequent copies, without using any special configuration.

At the timing when the graphics driver 206 has completed the processing of all pages for the first copy, storage of print data of a page having a higher processing load into the hard disk drive 110 is in an optimized state in a storable range. In a case where the processing for storing print data of the second and subsequent copies is performed, if it is determined that the free space F is not secured in the hard disk drive 110, the graphics driver 206 first performs processing for deleting a lower processing load part of the stored print data in step S407.

Subsequently, in step S409, the graphics driver 206 stores the print data of the present page. The stored print data becomes an object to be deleted in step S407 when the processing for the next page is performed.

As described above, even in a case where the storage of print data is optimized considering the processing load of each data, if a part of the stored print data is once deleted, a lower processing load part of the print data may be stored unwontedly. The present exemplary embodiment provides a configuration capable of eliminating any unnecessary file access.

Further, as understood from the flowchart illustrated in FIG. 4, if there is any available stored print data, the graphics driver 206 directly transfers the stored print data to the printer 115. If there is not any available stored print data, the graphics driver 206 newly generates print data and transfers the newly generated print data to the printer 115. Therefore, the print processor 205 is not required to manage stored print data of respective pages and does not need to perform special processing.

On the other hand, the graphics driver 206 can notify the print processor 205 of a stored page number. This is useful to prevent the print processor 205 from playing drawing data of the corresponding page. In this case, the processing time can be reduced because the play for the drawing data of unnecessary pages can be omitted.

Figure 5:
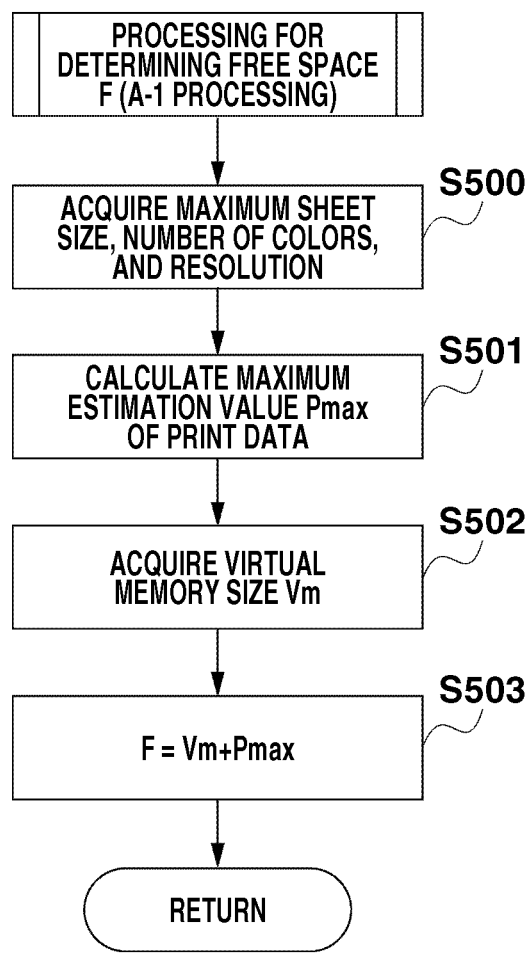
FIG. 5 is a flowchart illustrating an example of predetermined free space determination processing (hereinafter, referred to as "processing A-1").

Hereinafter, examples of the processing (A) to (E) included in the flowchart illustrated in FIG. 4 are described below. First, FIG. 5 is a flowchart illustrating an example of the free space F (predetermined value) determination processing (i.e., the processing A-1) that can be performed by the graphics driver 206.

First, in step S500, the graphics driver 206 acquires information (e.g., maximum sheet size, number of colors, and resolution) relating to a printer that the graphics driver 206 can support. The number of colors is generally equal to the number of inks used by an inkjet printer that performs printing by discharging a plurality of inks. The printer driver usually generates a halftone image for each ink to perform printing.

Next, in step S501, the graphics driver 206 calculates a maximum estimation value Pmax of the print data per page by referring to various values acquired in step S500. For example, the maximum estimation value Pmax of the print data can be obtained by multiplying numerical values representing the sheet size, the number of colors, and the resolution.

Next, in step S502, the graphics driver 206 acquires a virtual memory size Vm in a present OS environment by using the API provided by the OS. The virtual memory indicates a memory area of the hard disk drive 110 that can be used by the OS as an alternative of the RAM 109 (i.e., a hardware device) in a state where the memory capacity of the RAM 109 is fully used. In other words, the area usable as the virtual memory is an area that may be also used as a temporary area by various applications or by the OS itself.

In step S503, the graphics driver 206 obtains the value F by adding the maximum estimation value Pmax of the print data to the virtual memory size Vm (i.e., F=Vm+Pmax). As described above, the graphics driver 206 sets the value F to a size that can assure a reserved size of free space remaining as a virtual memory even when print data of one page is stored in the hard disk drive 110.

By preliminarily securing the above-described free space, the graphics driver 206 can perform print data storage processing without bringing the system or other applications into an unstable operational state.

In general, the virtual memory size Vm is sufficiently larger than the maximum estimation value Pmax of the print data. Therefore, the graphics driver 206 can skip the processing of step S500 and step S501 and directly use the virtual memory size Vm as the value F (i.e., F=Vm). Further, the free space (F) determination processing A-1 is executed every time when the print processing is started. However, it is usual that the virtual memory size Vm is set to a recommended value and is not so frequently changed. Therefore, the graphics driver 206 can use a predetermined fixed value as the value F.

Figure 6:
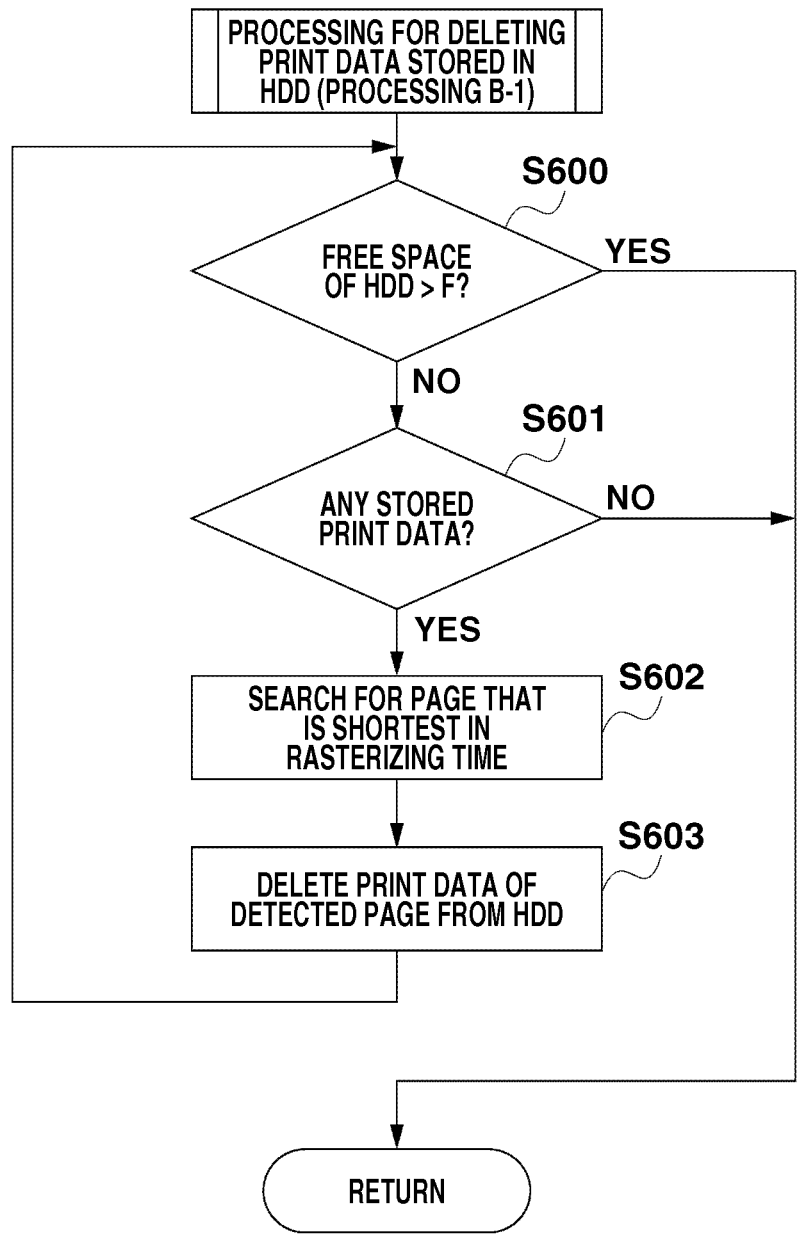
FIG. 6 is a flowchart illustrating an example of stored print data deletion processing (hereinafter, referred to as "processing B-1") according to the first exemplary embodiment.

FIG. 6 is a flowchart illustrating an example of the processing for deleting stored print data stored in the hard disk drive 110 (i.e., the processing B-1) that can be performed by the graphics driver 206. The purpose of the processing B-1 is to secure the free space F in the hard disk drive 110. Therefore, the graphics driver 206 does not delete all of the stored print data.

First, in step S600, the graphics driver 206 acquires a present free space of the hard disk drive 110 using the API provided by the OS and checks whether the present free space of the hard disk drive 110 is greater than the value F (i.e., the free space value determined in step S401). If the graphics driver 206 determines that the processing result in step S600 is YES (namely, if it is determined that the present free space of the hard disk drive 110 is greater than the predetermined value F), the graphics driver 206 determines that the present free space of the hard disk drive 110 is sufficiently large to store the print data of the target page and terminates the processing of step S407.

If the graphics driver 206 determines that the processing result in step S600 is NO (namely, if it is determined that the present free space of the hard disk drive 110 is equal to or less than the predetermined value F), then in step S601, the graphics driver 206 checks whether there is any stored print data in the hard disk drive 110.

If the graphics driver 206 determines that the processing result in step S601 is NO, the graphics driver 206 terminates the processing routine of the processing B-1 because the amount of the free space of the hard disk drive 110 cannot be increased by deleting the stored print data.

If the graphics driver 206 determines that the processing result in step S601 is YES, then in step S602, the graphics driver 206 searches for a page that is shortest in rasterizing time from among the stored print data. As described below, the graphics driver 206 stores print data of each page in association with time information relating to rasterizing processing for the page in the hard disk drive 110. Therefore, the graphics driver 206 can refer to the rasterizing time information stored beforehand and identify print data of the page that is shortest in rasterizing time, i.e., the page that is lowest in processing load.

Finally, the graphics driver 206 deletes the print data of the page identified in step S602 from the hard disk drive 110. The graphics driver 206 repeats the above-described processing of step S600 through step S603. If it is determined that there is not any object to be deleted (i.e., NO in step S601), or if it is determined that the present free space of the hard disk drive 110 is greater than the predetermined value F (i.e., YES in step S600), the graphics driver 206 terminates the processing routine of the processing B-1 illustrated in FIG. 6.

Figure 7:
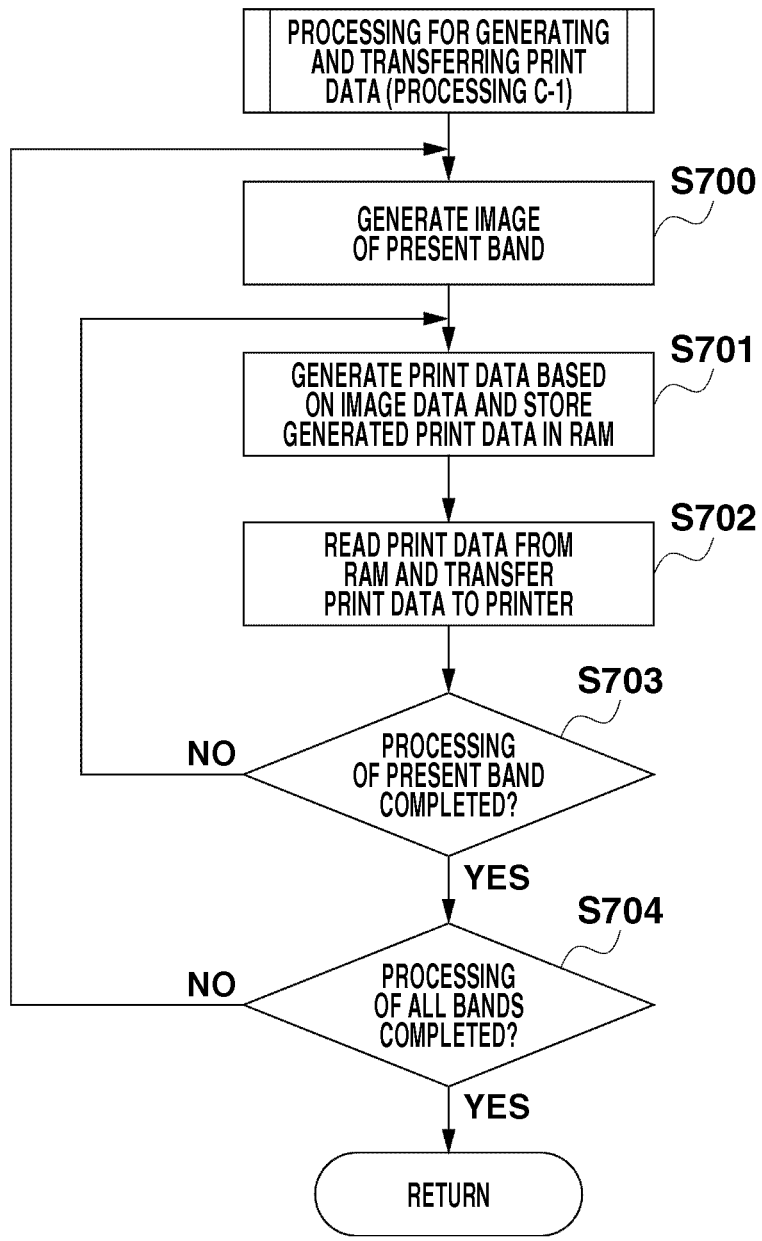
FIG. 7 is a flowchart illustrating an example of print data generation and transfer processing (hereinafter, referred to as "processing C-1") according to the first exemplary embodiment.

FIG. 7 is a flowchart illustrating an example of the processing for generating and transferring print data of a target page (i.e., the "processing C-1") that can be performed by the graphics driver 206. As described with reference to FIG. 2, the graphics driver 206 performs print data generation processing on a band-by-band basis (i.e., for each rectangular area that is referred to as a band), to reduce a memory capacity to be used for each processing of the print data.

First, in step S700, the graphics driver 206 generates raster image data of a band to be presently processed. Next, in step S701, the graphics driver 206 generates print data, as a unit of a predetermined amount, which can be processed by the printer 115 based on the raster image data and stores the generated print data in the RAM 109.

In step S702, the graphics driver 206 reads the generated print data from the RAM 109 and transfers the readout print data to the printer 115. Then, in step S703, the graphics driver 206 determines whether the processing of the presently processed band is completed.

If it is determined that the processing of the presently processed band is not completed (NO in step S703), the graphics driver 206 repeats the above-described processing of step S701 through step S702 until the conversion of the raster image data into print data and transferring of the print data to the printer 115 are thoroughly accomplished for the presently processed band.

If it is determined that the processing of the presently processed band is completed (YES in step S703), the graphics driver 206 starts processing for the next band. Then, in step S704, the graphics driver 206 determines whether the processing of all bands is completed. If it is determined that the processing of all bands is completed (YES in step S704), the graphics driver 206 terminates the processing routine of the processing C-1 illustrated in FIG. 7.

As described above, in an ordinary printing operation controlled by the graphics driver 206, the generated print data is successively stored in the RAM 109 and is deleted (overwritten) after it is transferred to the printer 115. A memory capacity of the RAM 109 required for the above-described processing is a small size that is comparable to a storage amount of the print data corresponding to several raster image data. Therefore, the memory capacity used by the graphics driver 206 is a small capacity.

Figure 8:
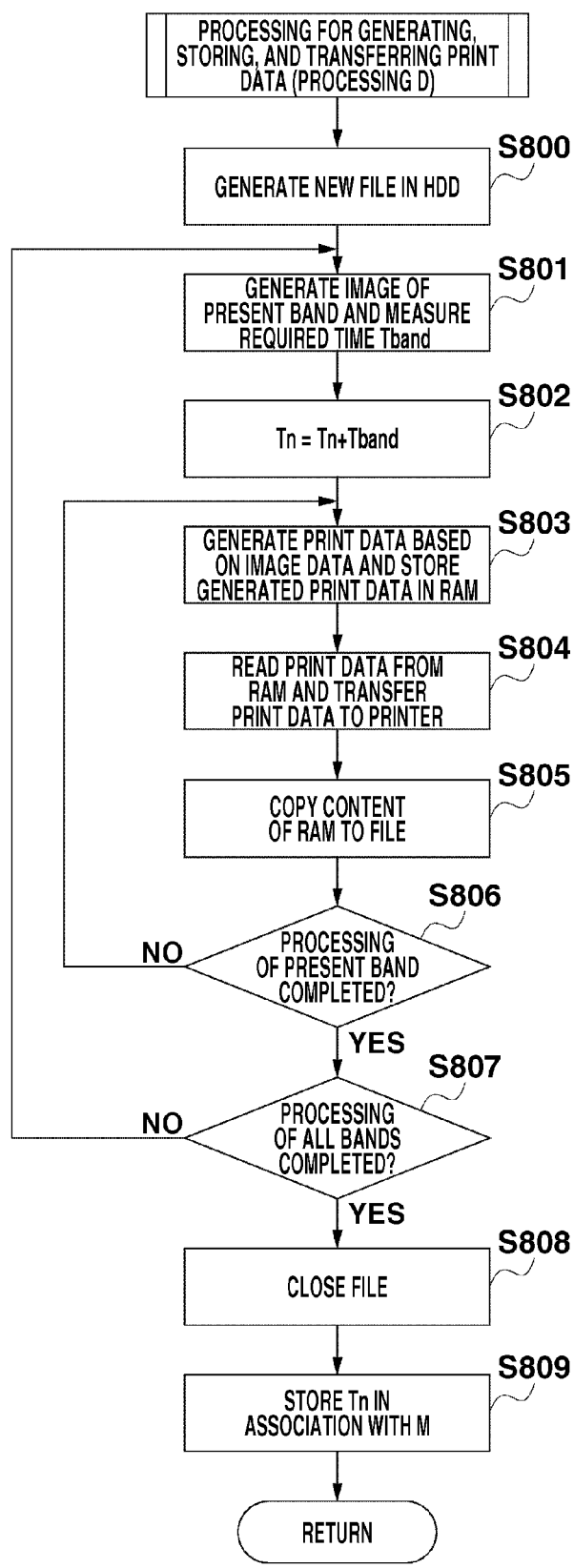
FIG. 8 is a flowchart illustrating an example of print data generation, storage, and transfer processing (hereinafter, referred to as "processing D").

FIG. 8 is a flowchart illustrating an example of the processing for storing the print data of a target page in the hard disk drive 110 in addition to the print data generation and transfer processing (i.e., the processing D) that can be performed by the graphics driver 206.

First, in step S800, the graphics driver 206 generates a new file in the hard disk drive 110. A file name of the newly generated file is a name that is searchable based on a page number.

Next, in step S801, the graphics driver 206 generates raster image data corresponding to the presently processed band and stores information relating to a time required for the generation as Tband. In step S802, the graphics driver 206 adds the value of Tband to a value of Tm to calculate an integrated value (i.e., Tm=Tm+Tband).

In steps S803 and S804, similar to the processing having been performed in steps S701 and S702, the graphics driver 206 performs processing for generating print data into the RAM 109 and transferring the generated data to the printer 115. In addition, the processing D includes processing of step S805, in which the graphics driver 206 copies the contents of the RAM 109 to the file generated on the hard disk drive 110 in step S800.

In steps S806 and S807, the graphics driver 206 repeats the processing for the target band and the processing for the target page, thereby performing the sequential processing for generating, transferring, and storing print data for the entire page.

If it is determined that the processing for the entire page is completed, then in step S808, the graphics driver 206 closes the file that has been generated on the hard disk drive 110 in step S800. In step S809, the graphics driver 206 stores the print data in such a way that the stored print data can be identified based on a value M (i.e., the page number of the print data). Further, the graphics driver 206 stores the value Tm (a time required for rasterizing the print data) in association with the value M. The above-described data can be stored in the RAM 109 or in the hard disk drive 110. Then, the graphics driver 206 terminates the processing routine of the processing D illustrated in FIG. 8 (i.e., the processing to be performed in step S409).

In the processing of the flowchart illustrated in FIG. 8, the graphics driver 206 stores the time information relating to the rasterizing processing in association with the print data. In this case, the time information to be stored can include a time required for other color processing. In short, any information that can be used to identify a load in generation of the print data can be stored.

Further, the graphics driver 206 executes the print data storage processing of step S409 only when it is determined in step S408 that the present free space of the hard disk drive 110 is greater than the value F. In the present exemplary embodiment, the value F is set to the value that is greater than the maximum estimation value Pmax of the print data. Therefore, it is rare that the graphics driver 206 fails in the processing for storing the print data due to the lack of memory capacity.

However, in an event that the storage of the print data into the hard disk drive 110 is unsuccessful in step S805, the graphics driver 206 deletes the file being currently generated and performs only the print data generation and transfer processing. The graphics driver 206 can regard the print data as not having been stored. As a result, the graphics driver 206 can speedily perform the rest of the processing without specifically taking a time for processing the print data.

Figure 9:
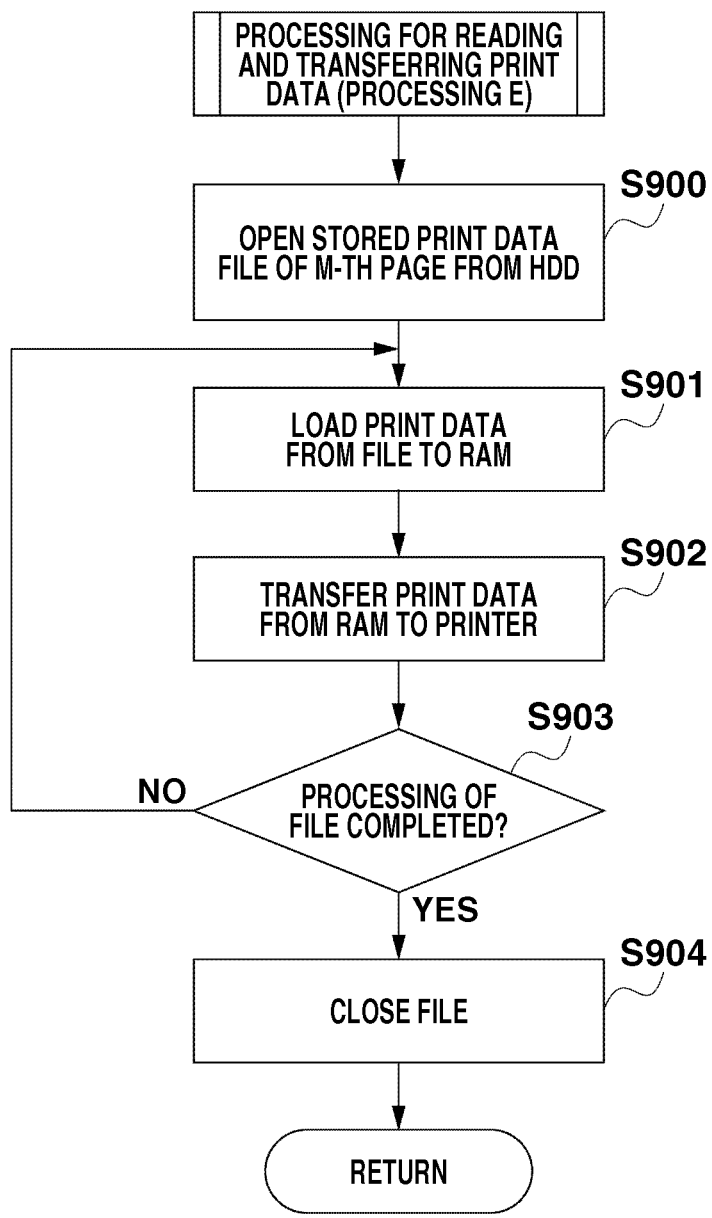
FIG. 9 is a flowchart illustrating an example of print data read and transfer processing (hereinafter, referred to as "processing E").

FIG. 9 is a flowchart illustrating an example of the processing for reading and transferring the print data (i.e., the processing E) that can be performed by the graphics driver 206, in a case where print data of a currently processed page is already stored in the hard disk drive 110.

First, in step S900, the graphics driver 206 opens the stored print data of the M-th page (i.e., the currently processed page) from the hard disk drive 110.

Next, in step S901, the graphics driver 206 loads a predetermined unit of print data from the file opened in step S900 to the RAM 109. In step S902, the graphics driver 206 transfers the read print data to the printer 115. In step S903, the graphics driver 206 determines whether the file processing is completed.

If it is determined that the file processing is not completed (NO in step S903), the graphics driver 206 repeats the above-described processing of steps S901 and S902. If it is determined that the file processing is completed (YES in step S903), then in step S904, the graphics driver 206 closes the file having been opened in step S900 and terminates the processing routine of the processing E illustrated in FIG. 9.

In the above-described exemplary embodiment of the present invention, the printing system stores print data into the hard disk drive 110 in descending order with respect to the processing load at the timing when the processing of the first copy is completed. Further, the printing system performs the storage processing in a state where the free space is sufficiently secured to prevent the system from being brought into an unstable state.

Therefore, if there is a possibility that the system becomes unstable due to storage of print data, the graphics driver 206 does not start the storage processing to prevent the load of the system from being further increased. The graphics driver 206 can perform operations with a lower RAM capacity.

On the other hand, in a case where the graphics driver 206 performs the print data storage processing, the graphics driver 206 confirms beforehand whether there is a sufficient amount of free space. Therefore, the graphics driver 206 does not fail in the print data storage processing.

The graphics driver 206 can perform the print processing for the second and subsequent copies by simply referring to and transferring the stored print data for a page having a higher processing load and performs the print data generation processing only for a page having a lower processing load.

Further, during the processing of the first copy, the graphics driver 206 repetitively checks whether there is a sufficient amount of free space in the hard disk drive 110 before starting the processing of each page. Therefore, even when the print data storage processing is once stopped due to the lack of memory capacity available in the hard disk drive 110, the graphics driver 206 can restart the print data storage processing if it is later confirmed that any available free space is secured in the hard disk drive 110 by an operation of another application.

In this case, the processing performed by the graphics driver 206 does not include retrying the print data storage processing and is limited to preliminarily confirming the latest free space of the hard disk drive 110. Therefore, a substantial load placed on the system is relatively low.

On the other hand, even after the print data storage processing is already completed for numerous pages to be printed, if the present free space of the hard disk drive 110 is fully used by an operation of another application, the graphics driver 206 deletes a part of the stored print data to prioritize the operation of the system or another application over the print data storage processing.

The purpose of storing print data and reusing the stored print data is to lower the total load in the print processing and promptly finish the print processing. In other words, the above-described processing is not a requisite condition for starting the print processing. Therefore, in some cases, the graphics driver 206 may delete all of the stored print data if it is effective to enable the system or another application to perform operations smoothly without causing any delay or stall.

Next, a second exemplary embodiment of the present invention is described below. Processing to be performed by the graphics driver 206 in the second exemplary embodiment is partly different from the processing of the flowchart illustrated in FIG. 4 according to the first exemplary embodiment. The second exemplary embodiment is similar to the first exemplary embodiment in the rest of the configuration and processing to be performed.

Figure 10:
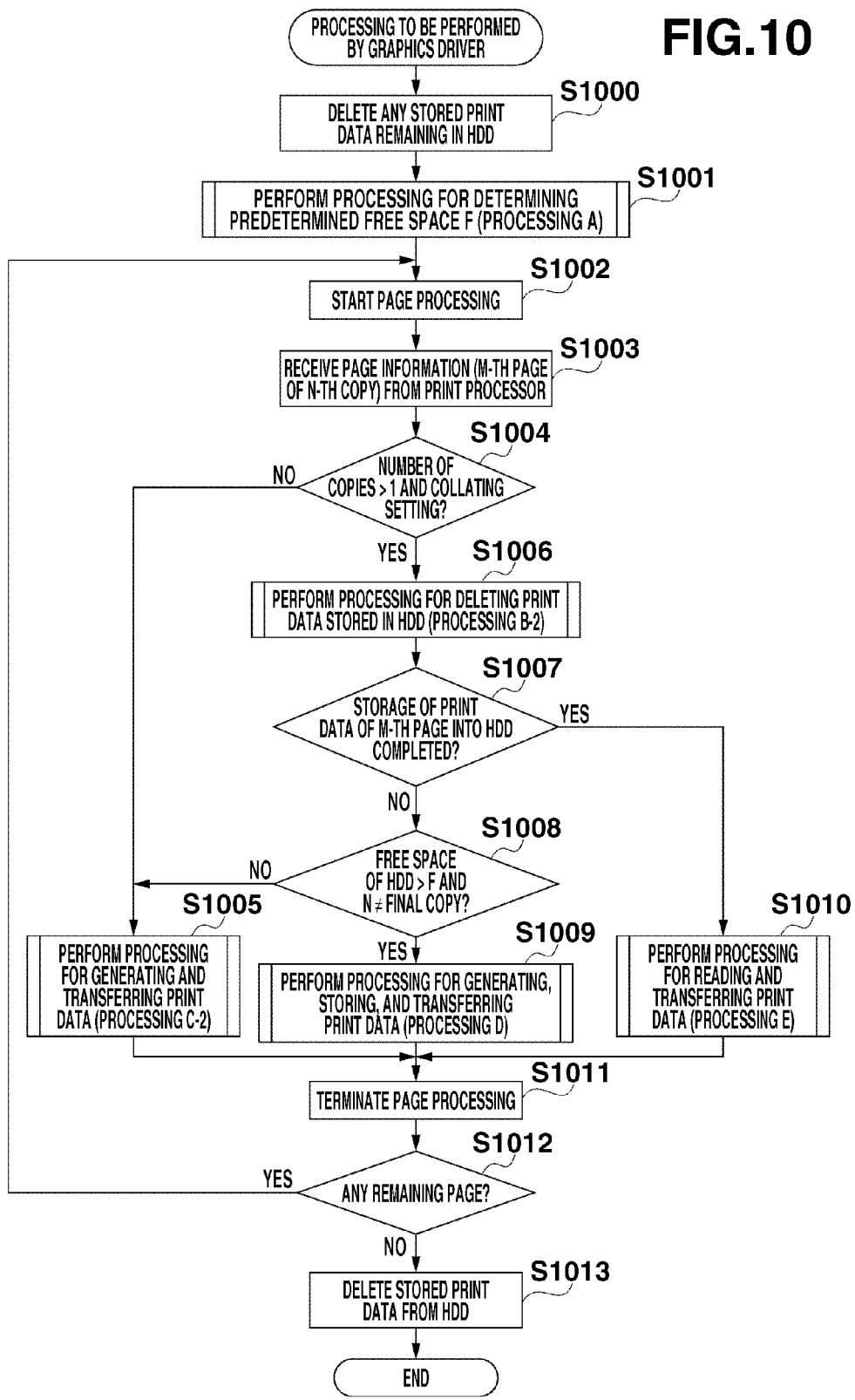
FIG. 10 is a flowchart illustrating print processing that can be performed by the graphics driver according to a second exemplary embodiment of the present invention.

FIG. 10 is a flowchart illustrating another example of the print processing that can be performed by the graphics driver 206, which corresponds to the print processing according to the first exemplary embodiment that has been described with reference to the flowchart illustrated in FIG. 4.

Processing to be performed in step S1000 through step S1004 is similar to the processing having been performed in step S400 through step S404 illustrated in FIG. 4. If the graphics driver 206 determines that the processing result in step S1004 is NO, namely when the collating multiple copy printing is not designated, then in step S1005, the graphics driver 206 performs print data generation and transfer processing according to the second exemplary embodiment. An example of the print data generation and transfer processing to be performed in step S1005 (i.e., the processing C-2) is described below in more detail.

In the present exemplary embodiment, if the graphics driver 206 determines that the processing result in step S1004 is YES, namely when the collating multiple copy printing is performed, the processing proceeds to step S1006. In step S1006, the graphics driver 206 executes processing for deleting the print data stored in the hard disk drive 110 according to the second exemplary embodiment.

As described above, the first exemplary embodiment performs the deletion processing (see step S407) only for the first copy. On the other hand, the graphics driver 206 according to the second exemplary embodiment performs the deletion processing for all copies.

An example of the stored print data deletion processing (i.e., the processing B-2) is described below in more detail. Processing to be performed in steps S1007 and S1010 is similar to the processing having been performed in steps S410 and S411. The graphics driver 206 reads stored print data and transfers the readout print data.

If the graphics driver 206 determines that the processing result in step S1007 is NO, namely in a case where the print data of the present page is not stored in the hard disk drive 110, the graphics driver 206 performs determination processing in the next step S1008.

In step S1008, similar to the processing having been performed in step S408, the graphics driver 206 checks whether the present free space of the hard disk drive 110 is greater than the value F. Further, the graphics driver 206 checks whether a copy number N of the currently processed copy does not indicate the final copy.

In the present exemplary embodiment, the graphics driver 206 performs print data storage processing, in addition to the stored print data deletion processing (i.e., the processing B-2), for each of the copies to be printed. However, regarding the print data storage processing, print data stored in the final copy is no longer referred to for another copy.

Therefore, the graphics driver 206 does not perform the storage processing for the final copy. Therefore, if the graphics driver 206 determines that the processing result in step S1008 is YES, namely only when the present free space of the hard disk drive 110 is greater than the value F and when the currently processed copy is not the final copy, the graphics driver 206 executes storage processing in step S1009.

The processing to be performed in step S1009 is similar to the processing having been performed in step S409. Processing to be performed in step S1011 through step S1013, which relates to repetition processing and termination processing, is similar to the processing having been performed in step S412 through step S414.

Figure 12:
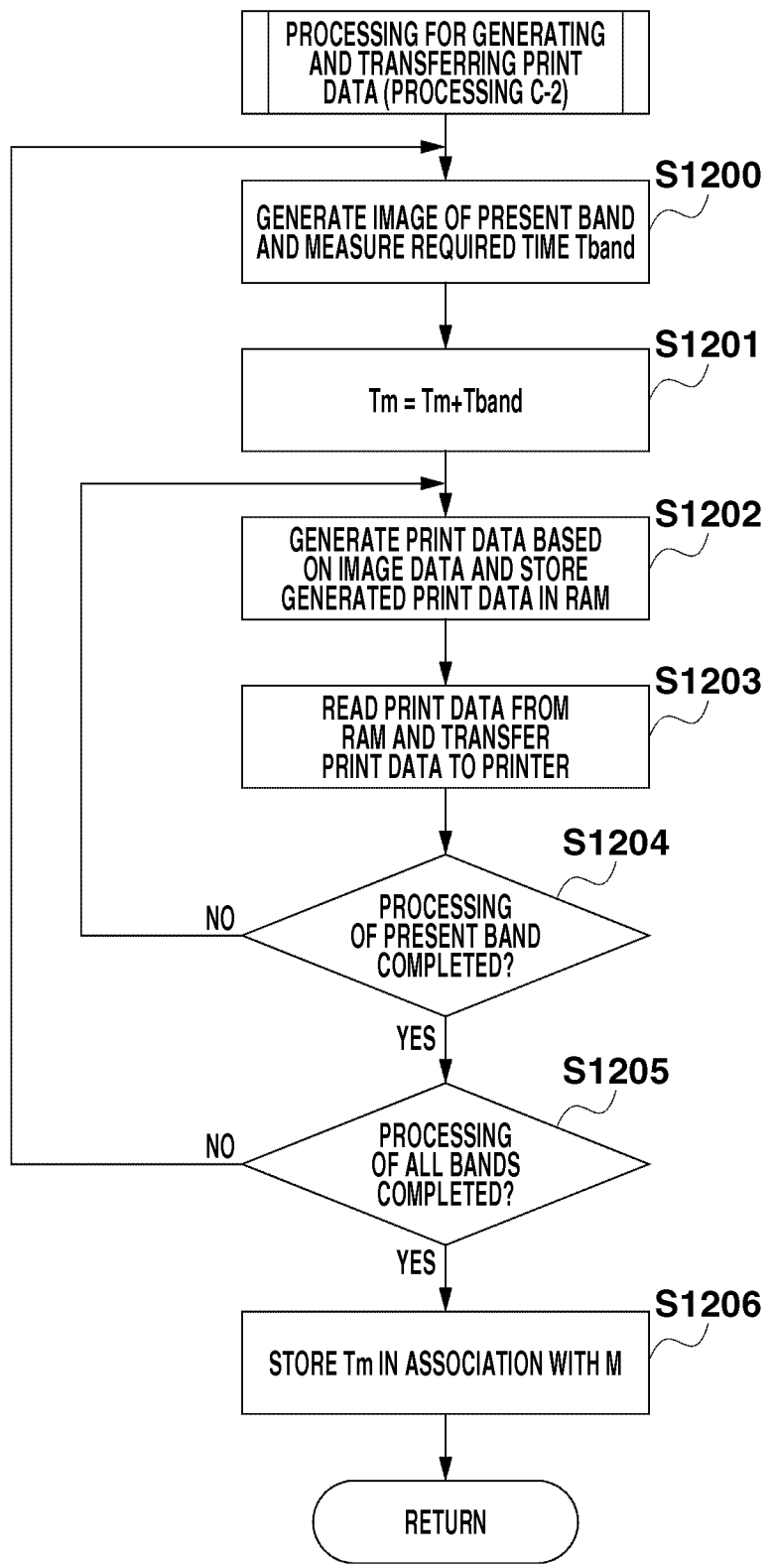
FIG. 12 is a flowchart illustrating an example of the print data generation and transfer processing (hereinafter, referred to as "processing C-2") according to the second exemplary embodiment.

Next, an example of the print data generation and transfer processing according to the present exemplary embodiment (i.e., the processing C-2) is described below with reference to a flowchart illustrated in FIG. 12. Processing to be performed in the processing C-2 is similar to the processing having been performed in the processing C-1, although descriptions relating to the common portions are not repeated.

The processing C-2 is different from the above-described processing C-1 in that rasterizing time measurement and storage processing is additionally performed. The rasterizing time measurement and storage processing included in the processing C-2 is similar to that having been performed in the processing D.

In steps S1200 and S1201, the graphics driver 206 measures a rasterizing time Tm. In step S1206, the graphics driver 206 stores the measured rasterizing time Tm in association with the present page number M. The obtained information is similar to the page information stored in step S808 and stored in the RAM 109.

It is desired that the stored information can be referred to as series information. Further, in a case where any page information having the same page number M is already present in the RAM 109, the graphics driver 206 overwrites the information to avoid any duplicate registration.

In short, in the present exemplary embodiment, at timing when the processing of the first copy is completed, the rasterizing time is stored in the RAM 109 not only for the stored page but also for the rest of all pages. In addition, print data of the page that is determined to be stored is stored in the hard disk drive 110 in such a manner that the stored print data can be identified with reference to its page number.

Figure 11:
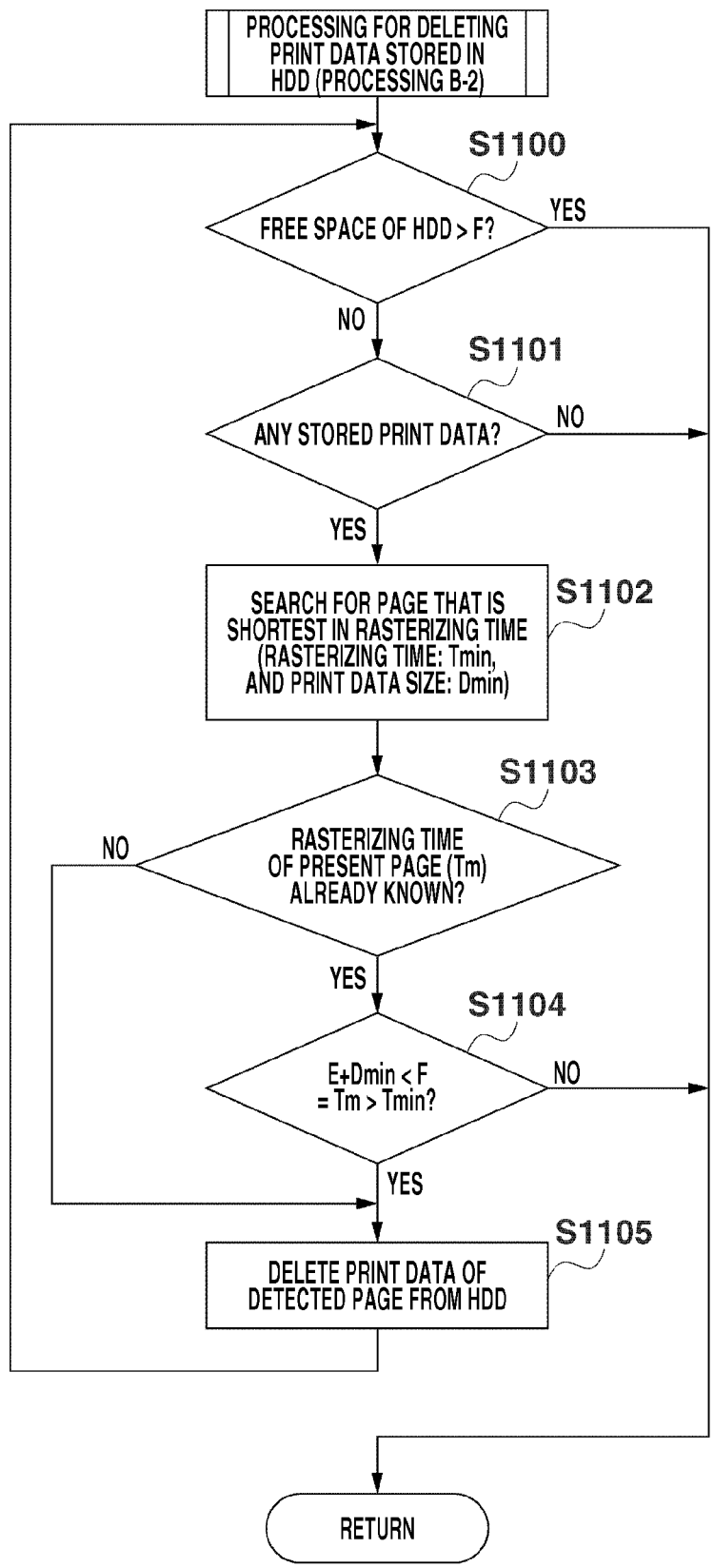
FIG. 11 is a flowchart illustrating another example of the stored print data deletion processing (hereinafter, referred to as "processing B-2") according to the second exemplary embodiment.

Next, an example of the stored print data deletion processing according to the present exemplary embodiment (i.e., the processing B-2) is described below with reference to a flowchart illustrated in FIG. 11. The processing B-2 is different from the above-described processing B-1 in deletion conditions to be referred to in the processing for deleting the print data.

First, processing to be performed in step S1100 through step S1102 is similar to the processing having been performed in step S600 through step S602 of the processing B-1. In the present exemplary embodiment, "E" represents the present free space of the hard disk drive 110, Tmin represents a rasterizing time of the page having the shortest rasterizing time (see step S1102), and Dmin represents a print data size of the page having the shortest rasterizing time.

Next, in step S1103, the graphics driver 206 checks whether the rasterizing time of the present page (Tm) is already known. As the processing B-2 is executed prior to the print data generation processing, the graphics driver 206 has no information relating to the rasterizing time (Tm) in the first copy processing. On the other hand, in the second copy processing (i.e., after the processing of steps S808 and S1206 is once completed), the graphics driver 206 can refer to the rasterizing time (Tm) measured in the first copy processing.

If it is determined that the rasterizing time of the present page (Tm) is not known (NO in step S1103), then in step S1105, the graphics driver 206 deletes print data of the detected page. The processing to be performed in step S1105 is similar to the processing having been performed in step S603. On the other hand, if it is determined that the rasterizing time of the present page (Tm) is already known (YES in step S1103), the graphics driver 206 performs the deletion processing only when any one of the following conditions is satisfied. The first condition is defined by the following formula.

$E$ (present free space of the hard disk drive 110)+$D$min (size of data to be deleted)<$F$ (predetermined free space to be secured in the hard disk drive 110)

The reason why the print data satisfying the above-described first condition is deleted is because the predetermined free space F cannot be secured in the hard disk drive 110 even after deleting the print data. In other words, at the moment when the deletion processing is completed, the hard disk drive 110 is not yet in a state where new print data can be stored in the secured free space F. Therefore, the graphics driver 206 cannot start storage processing.

For the purpose of stabilizing the operation of the system or another application, if the predetermined free space F is not secured in the hard disk drive 110, the graphics driver 206 continuously tries to delete the print data as much as possible to secure the required free space F.

The second condition is defined by the following formula.

$Tm > Tmin$

First, if the print data that does not satisfy the first condition is deleted, the processing result in the next step S1100 becomes YES. As a result, the graphics driver 206 stores print data of the present page.

In the present exemplary embodiment, the graphics driver 206 performs determination processing based on the second condition for the purpose of preventing the print data having a higher processing load, which is already determined in the first copy processing, from being deleted and further preventing print data having a lower processing load from being stored.

The second condition, as described above, is for determining whether Tm (rasterizing time of the present page) is longer than Tmin (rasterizing time of a page to be deleted). Only when the second condition is satisfied, the graphics driver 206 starts the deletion processing. Therefore, the graphics driver 206 can surely delete print data having a lower processing load and store print data of the present page having a higher processing load.

Through the determination processing using the above-described two conditions, the graphics driver 206 unconditionally executes the deletion processing until the predetermined free space F can be almost secured. Thus, the predetermined free space F can be constantly secured even in a case where the free space of the hard disk drive 110 is changed due to operations of the system or another application.

On the other hand, if deleting a stored page is necessary to newly store the present page, the graphics driver 206 compares processing loads of them and determines whether to leave the page data having a higher processing load or to newly store the present page.

The content of the first copy processing is not different between the present exemplary embodiment and the above-described first exemplary embodiment. The present exemplary embodiment is characterized in that the graphics driver 206 performs print data deletion and storage processing for each of the second and subsequent copies.

First, in a case where the free space of the hard disk drive 110 is reduced due to operations of the system or another application, the graphics driver 206 executes the print data deletion processing for each of the second and subsequent copies until the predetermined free space F can be secured.

On the contrary, if the free space of the hard disk drive 110 is increased due to other reasons, the graphics driver 206 executes the print data storage processing for the second and subsequent copies. Meanwhile, the graphics driver 206 has already optimized the print data storage processing for the first copy without substantially increasing or decreasing the free space of the hard disk drive 110. Therefore, based on a rasterizing time of the present page, the graphics driver 206 can determine whether to delete the stored print data and perform additional storage processing. Thus, the graphics driver 206 can constantly hold the print data having a higher processing load without uselessly performing the deletion and storage processing.

Next, a third exemplary embodiment of the present invention is described below. The third exemplary embodiment is different from the first and second exemplary embodiments in the content of the predetermined free space (F) determination processing (i.e., the processing A). The third exemplary embodiment is similar to the first and second exemplary embodiments with respect to the rest of the processing and configuration.

Figure 13:
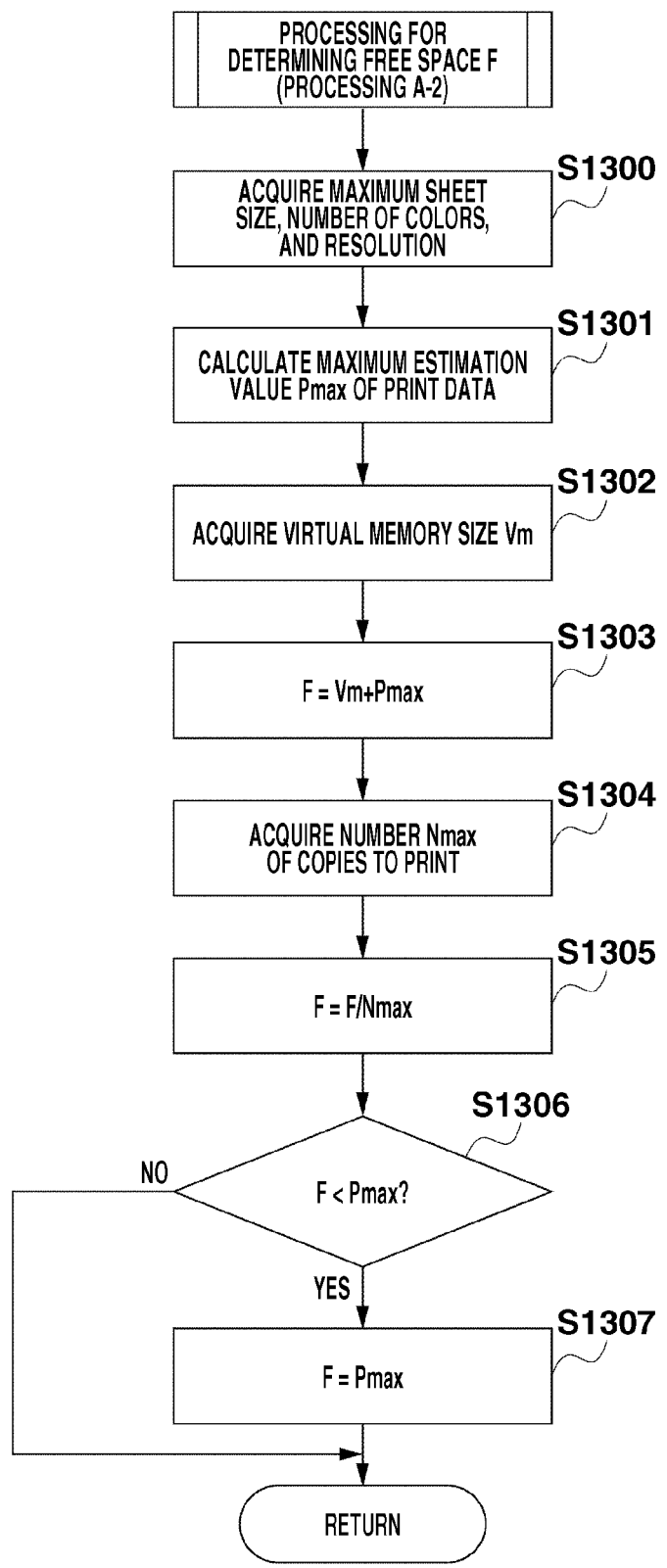
FIG. 13 is a flowchart illustrating an example of the predetermined free space determination processing (hereinafter, referred to as "processing A-2") according to a third exemplary embodiment of the present invention.

FIG. 13 illustrates an example of the free space (F) determination processing according to the present exemplary embodiment (i.e., the processing A-2). The processing A-2 is similar to the above-described processing A-1, except for additionally performing processing for adjusting the value F based on a number of copies to print that is designated by a user.

First, processing to be performed in step S1300 through step S1303 is similar to the processing having been performed in step S500 through step S503. Next, in step S1304, the graphics driver 206 according to the present exemplary embodiment acquires a number Nmax of copies to print that is designated by a user.

Next, in step S1305, the graphics driver 206 divides the value F by the number Nmax. A minimum value that can be set for the value F needs to be a value sufficient for storing print data of one page. Therefore, in step S1306, the graphics driver 206 determines whether the value F is smaller than the maximum estimation value Pmax of the print data. If the graphics driver 206 determines that the processing result in step S1306 is YES, then in step S1307, the graphics driver 206 sets the value F as the maximum estimation value Pmax of the print data.

The value F determined in step S1307 is a value whose minimum value is equal to the maximum estimation value Pmax of the print data and is inverse proportional to the number Nmax of copies to print.

More specifically, in a case where the number of copies designated by the user is large, the value F becomes a smaller value and accordingly the graphics driver 206 can frequently execute the print data storage processing (can continue the print data storage processing until the free space reduces to almost zero). For example, when the number of copies designated by the user is two, the graphics driver 206 can refer to the print data having been stored in the first copy only one time in the second copy processing.

On the other hand, when the number of copies designated by the user is 100, the graphics driver 206 can refer to the print data having been stored in the first copy ninety-nine times in the processing for the second and subsequent copies. As described above, the larger the number of copies is, the more the stored print data can be used frequently (i.e., the more the processing load can be efficiently reduced by the storage of the print data). In short, the present exemplary embodiment can flexibly change or adjust the storage processing considering effects brought by the storage processing.

The above-described calculation processing in step S1305 simply obtains the value F as a value that is inverse proportional to the value Nmax. However, it is also useful to multiply the calculated value by an arbitrary parameter to obtain the value F.

The processing A-2 that can actively use the free space of the hard disk drive 110 has a higher affinity in the configuration described in the second exemplary embodiment, in which the graphics driver 206 monitors the present free space of the hard disk drive 110 throughout a job.

Further, the present invention can be attained by executing the following processing. More specifically, a storage medium storing a code of software program that can realize functions of the above-described exemplary embodiments can be supplied to a system or an apparatus. A computer (or a CPU or a micro processing unit (MPU)) provided in the system or the apparatus can perform processing for reading the program code stored in the storage medium.

In this case, the program code itself having been read from the storage medium can realize the functions of the above-described exemplary embodiments. The above-described program code and the storage medium storing the program code can configure the present invention.

The above-described exemplary embodiment of the present invention is an example realized by a GDI driver. The present invention can be also applied to another exemplary embodiment using an XPS driver. In this case, it is desired to replace the print processor of the GDI driver with a layout filter of the XPS driver and further replace the graphics driver of the GDI driver with a rendering filter of the XPS driver.

Moreover, the print processor and the graphics driver of the GDI driver are regulated modules provided by the OS and are different in referable information and allocated roles. On the other hand, the XPS driver can include an arbitrary number of filters and can allocate an arbitrary role to each filter as long as the XPS driver keeps an interface determined by the OS.

As described above, among the print data generated in the collating printing, the exemplary embodiment of the present invention prioritizes storing print data having a higher processing load over print data having a lower processing load. Then, the exemplary embodiment of the present invention skips the processing for generating print data in subsequent processing for the same page. Therefore, the exemplary embodiment of the present invention can promptly perform printing control.

Further, the exemplary embodiment of the present invention can stabilize an operation of the system by executing processing for securing a predetermined free space in a storage area prior to the print data generation processing. Accordingly, the exemplary embodiment of the present invention can eliminate unnecessary file access.

In a case where the storage area is fully used by another processing executed on the same system, the exemplary embodiment of the present invention prioritizes an operational state of the system or another processing over the printing control processing. To this end, the exemplary embodiment of the present invention deletes print data having a lower processing load in such away as to secure a predetermined free space. On the other hand, in a case where a sufficient amount of free space is secured in the storage area for the printing control processing, the exemplary embodiment of the present invention can effectively use the secured free space to perform processing for storing print data.

In this manner, the exemplary embodiment of the present invention can dynamically respond to a variation of the storage area during the printing control processing, and can surely store print data having a higher processing load and promptly perform the printing control processing while maintaining a predetermined amount of free space.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-133171 filed Jun. 2, 2009, which is hereby incorporated by reference herein in its entirety.

What is claimed is:

1. A printing control apparatus comprising:
a storage unit configured to determine whether a free space of a storage device is equal to or less than a predetermined value in a case where print data of a first copy is generated and, if it is determined that the free space of the storage device is equal to or less than the predetermined value, further configured to delete print data stored in the storage device, generate print data of a page to be generated, transfer the generated print data to a printer, and store the generated print data in the storage device; and
a transfer unit configured to determine whether print data of the page to be generated is already stored in the storage device in a case where print data of second and subsequent copies is generated and, if it is determined that the print data of the page to be generated is already stored in the storage device, further configured to transfer the print data of the page to be generated, which is stored in the storage device, to the printer and, if it is determined that the print data of the page to be generated is not stored in the storage device, further configured to generate print data of the page to be generated and transfer the generated print data to the printer.

2. The printing control apparatus according to claim 1, wherein the storage unit is configured to determine whether the free space of the storage device is equal to or less than the predetermined value before generating the print data in a case where the print data of the first copy is generated and, if it is determined that the free space of the storage device is equal to or less than the predetermined value, further configured to delete print data stored in the storage device and determine whether the free space of the storage device in a state where the print data deletion processing has been completed is equal to or less than the predetermined value, and if it is determined that the free space of the storage device in the state where the print data deletion processing has been completed is equal to or less than the predetermined value, further configured to generate print data of a page to be generated and transfer the generated print data to the printer and, if it is determined that the free space of the storage device in the state where the print data deletion processing has been completed exceeds the predetermined value, further configured to generate print data of the page to be generated, transfer the generated print data to the printer, and store the generated print data in the storage device.

3. The printing control apparatus according to claim 1, wherein the storage unit is configured to determine whether the free space of the storage device is equal to or less than the predetermined value before generating the print data in a case where the print data of the first copy is generated and, if it is determined that the free space of the storage device is equal to or less than the predetermined value, further configured to delete none of the print data stored in the storage device if there is not any stored print data and delete the print data stored in the storage device if there is the stored print data until the free space of the storage device becomes equal to or less than the predetermined value, generate the print data of the page to be generated, transfer the generated print data to the printer, and store the generated print data in the storage device.

4. The printing control apparatus according to claim 1, wherein the predetermined value becomes smaller in a case where the number of copies is large compared to a case where the number of copies is small.

5. The printing control apparatus according to claim 1, wherein the storage unit is configured, if it is determined that the free space of the storage device is equal to or less than the predetermined value, to delete, from the storage device, stored print data of a page requiring less processing time than other pages of stored print data before generating print data of a page to be generated next, to generate the print data of the page to be generated next, to transfer the generated print data to a printer and to store the generated print data in the storage device.

6. A printing control apparatus comprising:
a deletion unit configured to determine whether a free space of a storage device is equal to or less than a predetermined value and delete print data stored in the storage device if it is determined that the free space of the storage device is equal to or less than the predetermined value; and
a transfer unit configured to determine whether print data of a page to be generated is stored in the storage device in a state where the deletion processing by the deletion unit is completed and, if it is determined that the print data of the page to be generated is stored in the storage device, further configured to transfer the print data of the page to be generated, which is stored in the storage device, to a printer and, if it is determined that the print data of the page to be generated is not stored in the storage device, further configured to determine whether the free space of the storage device is equal to or less than the predetermined value and, if it is determined that the free space of the storage device is equal to or less than the predetermined value, further configured to generate the print data of the page to be generated and transfer the generated print data to the printer and, if it is determined that the free space of the storage device exceeds the predetermined value, further configured to generate the print data of the page to be generated, transfer the generated print data to the printer, and store the generated print data to the storage device.

7. The printing control apparatus according to claim 6, wherein the transfer unit is configured to determine whether the print data of the page to be generated is stored in the storage device in a state where the deletion processing by the deletion unit is completed and, if it is determined that the print data of the page to be generated is stored in the storage device, further configured to transfer the print data of the page to be generated, which is stored in the storage device, to the printer and, if it is determined that the print data of the page to be generated is not stored in the storage device, further configured to determine whether the free space of the storage device exceeds the predetermined value and whether a present copy is not the final copy, and if it is determined that the free space of the storage device is equal to or less than the predetermined value or if it is determined that the present copy is the final copy, further configured to generate the print data of the page to be generated and transfer the generated print data to the printer and, if it is determined that the free space of the storage device exceeds the predetermined value and the present copy is not the final copy, further configured to generate the print data of the page to be generated, transfer the generated print data to the printer, and store the generated print data in the storage device.

8. The printing control apparatus according to claim 6, wherein the deletion unit is configured, if it is determined that the free space of the storage device is equal to or less than the predetermined value, to delete, from the storage device, stored print data of a page requiring less processing time than other pages of stored print data before generating print data of a page to be generated next by the transfer unit.

9. A printing control method comprising:
    determining whether a free space of a storage device is equal to or less than a predetermined value in a case where print data of a first copy is generated;
    if it is determined that the free space of the storage device is equal to or less than the predetermined value, deleting print data stored in the storage device, generating print data of a page to be generated, transferring the generated print data to a printer, and storing the generated print data in the storage device;
    determining whether print data of the page to be generated is already stored in the storage device in a case where print data of second and subsequent copies is generated;
    if it is determined that the print data of the page to be generated is already stored in the storage device, transferring the print data of the page to be generated, which is stored in the storage device, to the printer; and
    if it is determined that the print data of the page to be generated is not stored in the storage device, generating print data of the page to be generated and transferring the generated print data to the printer.

10. The printing control method according to claim 9, further comprising:
    determining whether the free space of the storage device is equal to or less than the predetermined value before generating the print data in a case where the print data of the first copy is generated;
    if it is determined that the free space of the storage device is equal to or less than the predetermined value, deleting print data stored in the storage device and determining whether the free space of the storage device in a state where the print data deletion processing has been completed is equal to or less than the predetermined value;
    if it is determined that the free space of the storage device in the state where the print data deletion processing has been completed is equal to or less than the predetermined value, generating print data of the page to be generated and transferring the generated print data to the printer; and
    if it is determined that the free space of the storage device in the state where the print data deletion processing has been completed exceeds the predetermined value, generating print data of the page to be generated, transferring the generated print data to the printer, and storing the generated print data in the storage device.

11. The printing control method according to claim 9, further comprising:
    determining whether the free space of the storage device is equal to or less than the predetermined value before generating the print data in a case where the print data of the first copy is generated; and
    if it is determined that the free space of the storage device is equal to or less than the predetermined value, deleting none of the print data stored in the storage device if there is not any stored print data and deleting the print data stored in the storage device if there is the stored print data until the free space of the storage device becomes equal to or less than the predetermined value, generating the print data of the page to be generated, transferring the generated print data to the printer, and storing the generated print data in the storage device.

12. The printing control method according to claim 9, wherein the predetermined value becomes smaller in a case where the number of copies is large compared to a case where the number of copies is small.

13. A printing control method according to claim 12, further comprising:
    determining whether a free space of a storage device is equal to or less than a predetermined value and deleting print data stored in the storage device if it is determined that the free space of the storage device is equal to or less than the predetermined value;
    determining whether print data of a page to be generated is stored in the storage device in a state where the deletion processing is completed;
    if it is determined that the print data of the page to be generated is stored in the storage device, transferring the print data of the page to be generated, which is stored in the storage device, to a printer;
    if it is determined that the print data of the page to be generated is not stored in the storage device, determining whether the free space of the storage device is equal to or less than the predetermined value;
    if it is determined that the free space of the storage device is equal to or less than the predetermined value, generating the print data of the page to be generated and transferring the generated print data to the printer; and if it is determined that the free space of the storage device exceeds the predetermined value, generating the print data of the page to be generated, transferring the generated print data to the printer, and storing the generated print data to the storage device.

14. The printing control method according to claim 13, further comprising:

determining whether the print data of the page to be generated is stored in the storage device in a state where the deletion processing is completed;

if it is determined that the print data of the page to be generated is stored in the storage device, transferring the print data of the page to be generated, which is stored in the storage device, to the printer;

if it is determined that the print data of the page to be generated is not stored in the storage device, determining whether the free space of the storage device exceeds the predetermined value and whether a present copy is not the final copy;

if it is determined that the free space of the storage device is equal to or less than the predetermined value or if it is determined that the present copy is the final copy, generating the print data of the page to be generated and transferring the generated print data to the printer; and if it is determined that the free space of the storage device exceeds the predetermined value and the present copy is not the final copy, generating the print data of the page to be generated, transferring the generated print data to the printer, and storing the generated print data in the storage device.

15. The printing control method according to claim 9, further comprising:

if it is determined that the free space of the storage device is equal to or less than the predetermined value, deleting, from the storage device, stored print data of a page requiring less processing time than other pages of stored print data before generating print data of a page to be generated next, generating the print data of the page to be generated next, transferring the generated print data to a printer and storing the generated print data in the storage device.

16. A non-transitory computer-readable storage medium that stores a software program that causes a computer to execute a printing control method comprising:

determining whether a free space of a storage device is equal to or less than a predetermined value in a case where print data of a first copy is generated;

if it is determined that the free space of the storage device is equal to or less than the predetermined value, deleting print data stored in the storage device, generating print data of a page to be generated, transferring the generated print data to a printer, and storing the generated print data in the storage device;

determining whether print data of the page to be generated is already stored in the storage device in a case where print data of second and subsequent copies is generated;

if it is determined that the print data of the page to be generated is already stored in the storage device, transferring the print data of the page to be generated, which is stored in the storage device, to the printer; and if it is determined that the print data of the page to be generated is not stored in the storage device, generating print data of the page to be generated and transferring the generated print data to the printer.

17. The non-transitory computer-readable storage medium according to claim 16, further comprising:

determining whether the free space of the storage device is equal to or less than the predetermined value before generating the print data in a case where the print data of the first copy is generated;

if it is determined that the free space of the storage device is equal to or less than the predetermined value, deleting print data stored in the storage device and determining whether the free space of the storage device in a state where the print data deletion processing has been completed is equal to or less than the predetermined value;

if it is determined that the free space of the storage device in the state where the print data deletion processing has been completed is equal to or less than the predetermined value, generating print data of the page to be generated and transferring the generated print data to the printer; and if it is determined that the free space of the storage device in the state where the print data deletion processing has been completed exceeds the predetermined value, generating print data of the page to be generated, transferring the generated print data to the printer, and storing the generated print data in the storage device.

18. The non-transitory computer-readable storage medium according to claim 16, further comprising:

determining whether the free space of the storage device is equal to or less than the predetermined value before generating the print data in a case where the print data of the first copy is generated; and if it is determined that the free space of the storage device is equal to or less than the predetermined value, deleting none of the print data stored in the storage device if there is not any stored print data and deleting the print data stored in the storage device if there is the stored print data until the free space of the storage device becomes equal to or less than the predetermined value, generating the print data of the page to be generated, transferring the generated print data to the printer, and storing the generated print data in the storage device.

19. The non-transitory computer-readable storage medium according to claim 16, wherein the predetermined value becomes smaller in a case where the number of copies is large compared to a case where the number of copies is small.

20. The non-transitory computer-readable storage medium according to claim 16, the printing control method further comprising:

if it is determined that the free space of the storage device is equal to or less than the predetermined value, deleting, from the storage device, stored print data of a page requiring less processing time than other pages of stored print data before generating print data of a page to be generated next, generating the print data of the page to be generated next, transferring the generated print data to a printer and storing the generated print data in the storage device.

21. A non-transitory computer-readable storage medium that stores a software program that causes a computer to execute a printing control method comprising:

determining whether a free space of a storage device is equal to or less than a predetermined value and deleting print data stored in the storage device if it is determined that the free space of the storage device is equal to or less than the predetermined value;

determining whether print data of a page to be generated is stored in the storage device in a state where the deletion processing is completed;

if it is determined that the print data of the page to be generated is stored in the storage device, transferring the print data of the page to be generated, which is stored in the storage device, to a printer;

if it is determined that the print data of the page to be generated is not stored in the storage device, determining whether the free space of the storage device is equal to or less than the predetermined value;

if it is determined that the free space of the storage device is equal to or less than the predetermined value, generating the print data of the page to be generated and transferring the generated print data to the printer; and if it is determined that the free space of the storage device exceeds the predetermined value, generating the print data of the page to be generated, transferring the generated print data to the printer, and storing the generated print data to the storage devie.

22. The non-transitory computer-readable storage medium according to claim 21, further comprising:

determining whether the print data of the page to be generated is stored in the storage device in a state where the deletion processing is completed;

if it is determined that the print data of the page to be generated is stored in the storage device, transferring the print data of the page to be generated, which is stored in the storage device, to the printer;

if it is determined that the print data of the page to be generated is not stored in the storage device, determining whether the free space of the storage device exceeds the predetermined value and whether a present copy is not the final copy;

if it is determined that the free space of the storage device is equal to or less than the predetermined value or if it is determined that the present copy is the final copy, generating the print data of the page to be generated and transferring the generated print data to the printer; and if it is determined that the free space of the storage device exceeds the predetermined value and the present copy is not the final copy, generating the print data of the page to be generated, transferring the generated print data to the printer, and storing the generated print data in the storage device.

\* \* \* \* \*